Figure 5:
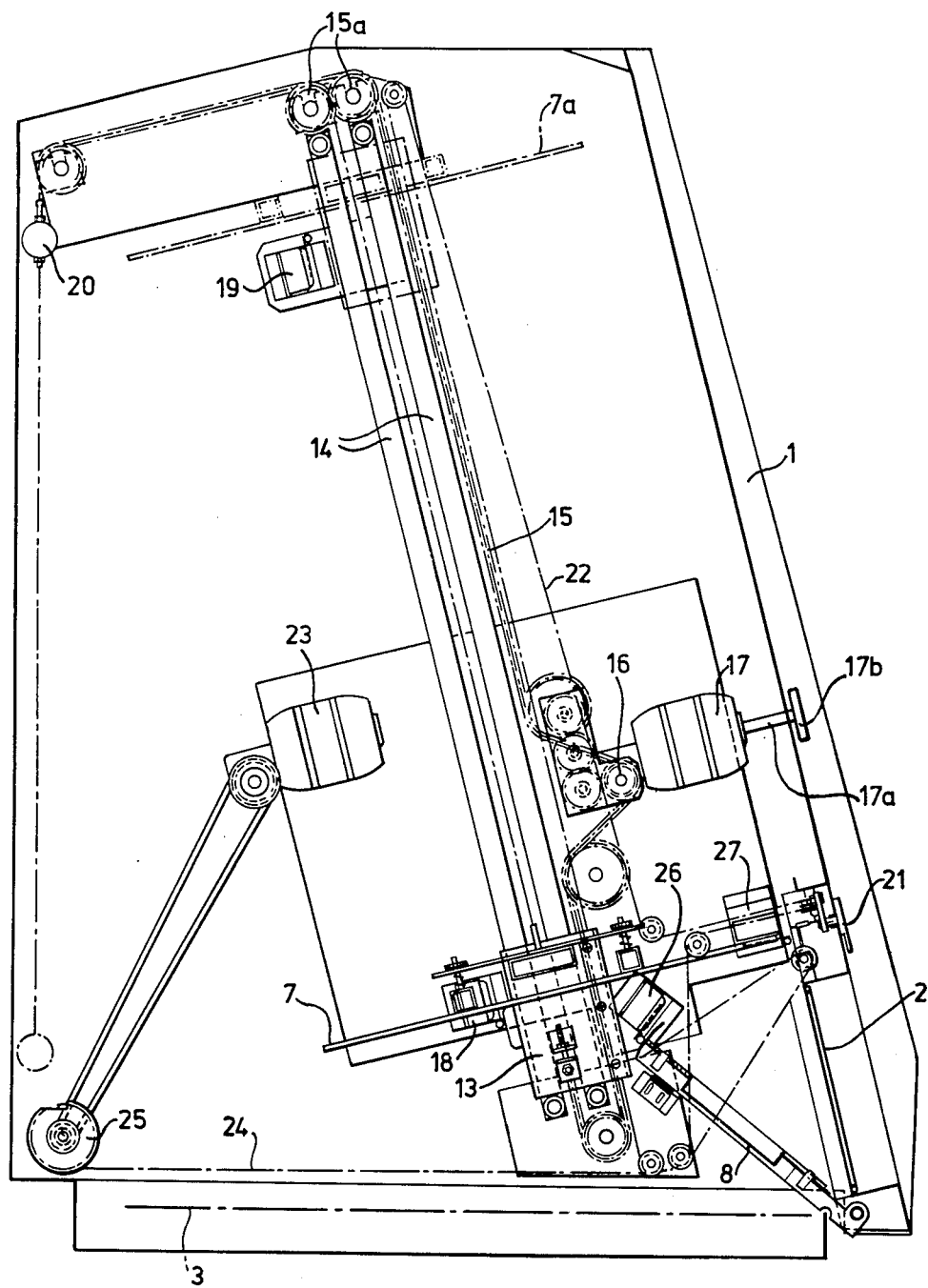

United States Patent [19]

Seib

[11] 4,054,382
[45] Oct. 18, 1977

[54] OPTICAL VIEWING APPARATUS

[76] Inventor: Martin Raymond Percival Seib, 81, Camberwell Grove, Camberwell, London S. E. 5, England

[21] Appl. No.: 665,502

[22] Filed: Mar. 10, 1976

[30] Foreign Application Priority Data

Mar. 10, 1975 United Kingdom .............. 9868/75

[51] Int. Cl.$^2$ ............................................. G03B 13/28
[52] U.S. Cl. ....................................... 355/45; 355/5; 355/43
[58] Field of Search ................. 355/8, 51, 45, 5, 43, 355/65, 66

[56] References Cited

U.S. PATENT DOCUMENTS

| | | | |
|---|---|---|---|
| 3,007,369 | 11/1961 | Squassoni et al. | 355/45 X |
| 3,181,416 | 5/1965 | Halberg | 355/45 X |
| 3,526,456 | 9/1970 | Sage et al. | 355/45 X |
| 3,547,531 | 12/1970 | Wells | 355/45 X |
| 3,733,128 | 5/1973 | Naumann et al. | 355/45 |
| 3,899,248 | 8/1975 | Tiger | 355/45 X |

Primary Examiner—Richard A. Wintercorn
Attorney, Agent, or Firm—Howson and Howson

[57] ABSTRACT

An improved microfilm reader/printer is described having a back-projection screen and which permits permanent copies of input material to be produced at magnifications varying between minimum and maximum limits. The viewing screen is too small to accommodate the entire image in both height and width dimensions at the maximum magnification but is positioned and dimensioned to receive all of a maximum sized image in one of those directions. Preferably the screen is large enough to accommodate the full image in both directions at the minimum magnification.

8 Claims, 5 Drawing Figures

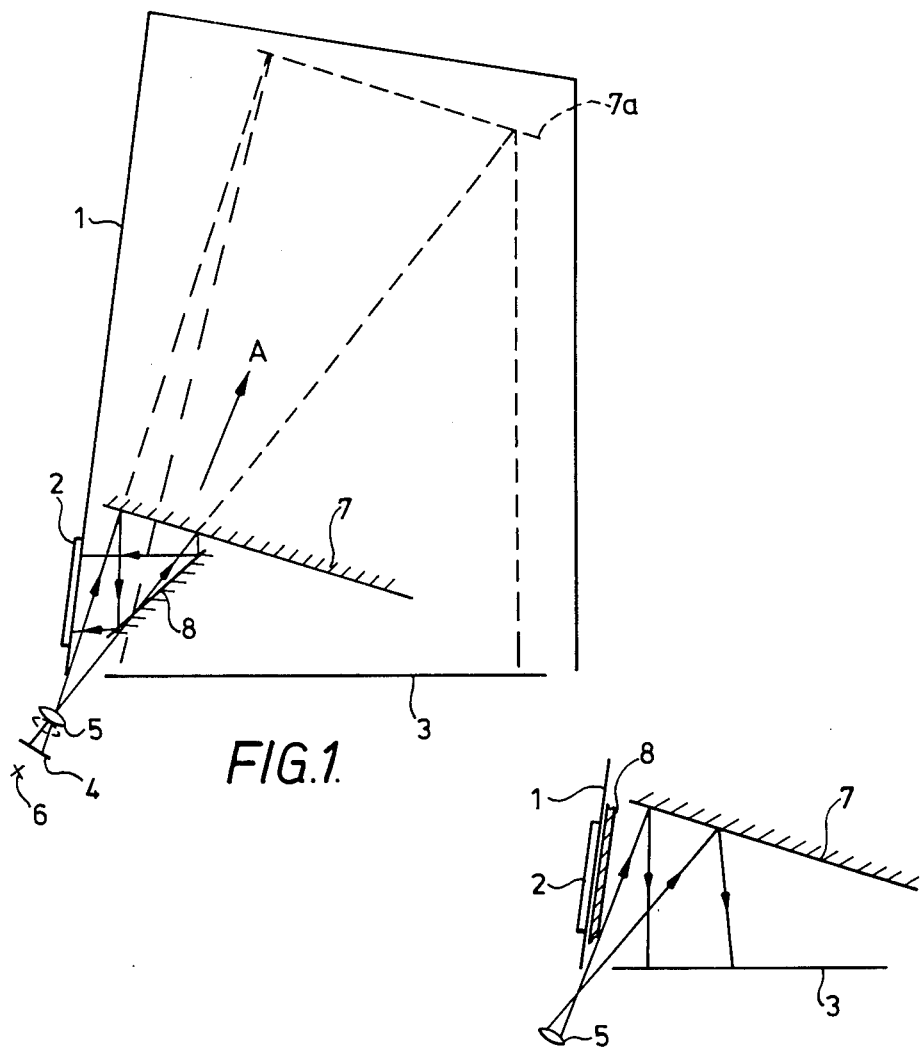
FIG.1.
FIG.2.
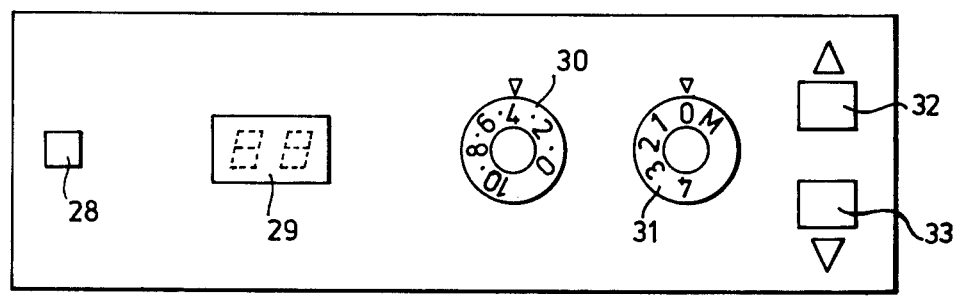
FIG.4.

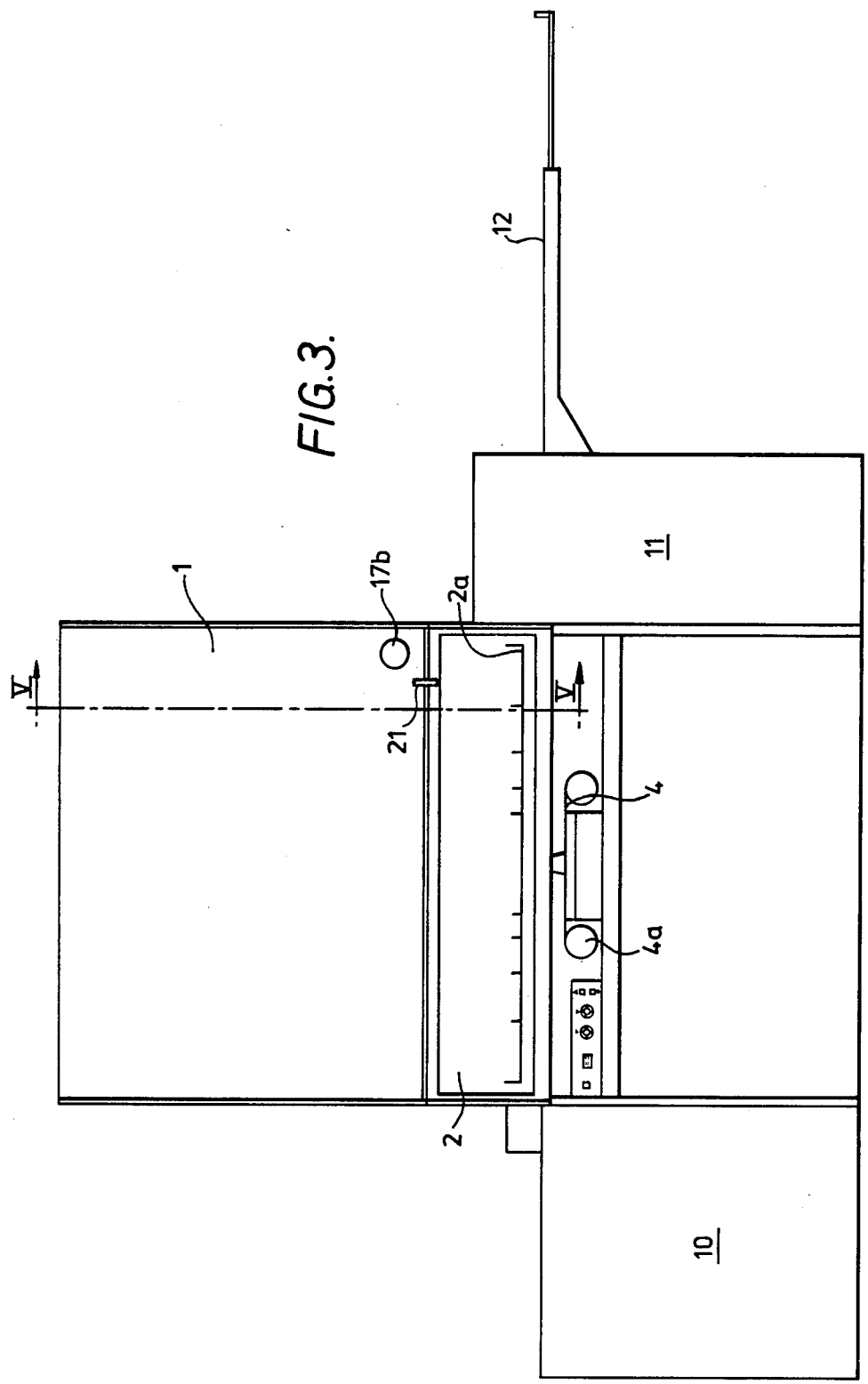

OPTICAL VIEWING APPARATUS

This invention relates to optical viewing apparatus having an optional print facility whereby a permanent record of an image viewed on the apparatus can be produced in the apparatus. Such apparatus will hereafter be referred to as "view/print apparatus". A particular, but not unique, example of view/print apparatus is a microfilm reader/printer and this invention has particular utility in the case of microfilm reader/printers which can produce the permanent record on a sheet selected from a range of different sizes of sheet and at a selected degree of magnification.

According to the invention a view/print apparatus comprises a casing, a back-projection viewing screen forming part of the casing on which the image to be viewed is projected from within the casing, a print plane on which a light-sensitive sheet of image recording material can be located for exposure to the image when the print facility is to be employed, a mirror movable between "view" and "print" positions, in the former of which the image is projected on the screen with a selected accuracy of focus and in the latter of which the image is projected on the print plane with substantially no change in the accuracy of focus, and means to vary the size of the image up to a maximum rectangular frame size, and is characterised in that the screen is dimensioned and positioned in the casing to accommodate only a part of the image when the size-varying means is set for maximum frame size, that part including one complete edge of the maximum sized frame and a region adjacent thereto.

Conveniently the mirror in its "print" position masks the print plane from ambient light passing through the viewing screen. The mirror, in its "view" position desirably bisects the angle between the print plane and the viewing screen.

Conveniently the viewing screen is dimensioned and positioned to permit an operator to view a narrow strip adjacent to the bottom edge of the rectangular frame when viewing on maximum enlargement but is large enough to accommodate the entire image on a smaller (normally the smallest) enlargement.

Conveniently the size-varying means is arranged so that the image of said one edge does not move normal to itself when the degree of magnification is altered. When this is ensured, the viewing screen can incorporate a graticule ruled with a common baseline representing the position of said one edge on the screen and a series of lines normal to the common baseline to represent the position of adjacent sides of the rectangular frame for selected degrees of magnification.

The casing conveniently incorporates a horizontal printing plane, a viewing screen inclined to the horizontal at an angle of between 90° and 45° and the size-varying means incorporates a mirror inclined to the horizontal and movable to different heights above the printing plane, each particular height corresponding to a particular degree of magnification.

The invention will now be further described, by way of example, with reference to the accompanying schematic drawings, in which FIG. 1 shows the general optical arrangement shown in the "view" position, FIG. 2 presents a part of FIG. 1 shown in the "print" position, FIG. 3 is a front elevation of an apparatus in accordance with the invention, FIG. 4 is an enlarged view of the control panel of the apparatus of FIG. 3, and FIG. 5 is a cross-section on the line V—V of FIG. 3.

Referring to FIG. 1, the view/print apparatus shown comprises a casing 1, a part of which is defined by a translucent viewing screen 2 on which an image (e.g. of a microfilm input 4) can be seen by back projection. FIG. 1 shows the optical system in the condition required for viewing the image on the screen 2 and in the condition giving a minimum degree of magnification.

Light from a source 6 passes through the input material 4 and via a lens 5 is focused to form a sharp image on the screen 2 via a translatable mirror 7 and a turnable mirror 8. The paths of light rays through the lens 5 to the screen 2 in this condition of the apparatus are shown by continuous lines in FIG. 1.

To vary the degree of magnification, the translatable mirror 7 may be moved upwardly in the direction of the arrow A to the position indicated by the dotted line 7a which represents the position required for maximum magnification. Dashed lines indicate the extension of the light rays for the alternative position of the translatable mirror 7.

In the lowest position of the mirror 7 the screen 2 receives a complete image of the input material 4 whereas with higher degrees of magnification only a part of the full image appears on the screen 2, the remainder being projected down onto a print plane indicated at 3.

When it is desired to take a permanent record of an image viewed on the screen 2, the turnable mirror 8 is rotated (anticlockwise as shown in FIG. 1) to lie adjacent to the screen 2 and substantially parallel thereto somewhat as shown schematically in FIG. 2. In this condition, irrespective of the degree of magnification, the entire image is projected down onto the print plane 3 and can be recorded on suitably sensitised material placed on that plane. A variety of known mechanisms is available for automatically producing permanent records from light-sensitised material and it is not deemed necessary to describe these mechanisms here since they do not form a part of the present invention. An electrophotographic process is particularly suitable.

By arranging for the turnable mirror 8 to bisect the angle between the screen 2 and the print plane 3 when in the "view" position shown in FIG. 1, it is possible to ensure that if the image on the screen 2 is in focus with the mirror in the "view" position, the image on the print plane 3 will also be in focus when the mirror 8 is in the "print" position.

The optical arrangement shown in FIG. 1 can readily be arranged to ensure that irrespective of the degree of magnification employed (i.e. irrespective of the height of the translatable mirror 7 relative to the print plane 3), the bottom edge of an image will always occur at the same position on the print plane 3 and at the same position on the viewing screen 2. This means that the viewing screen 2 can be marked with a scale. The bottom edge of an image of a rectangular frame (e.g. a microfilm image of a computer read-out sheet or an engineering drawing), will always be coincident with a common baseline on the screen and the proportion of the total image which is visible on the screen 2 will depend on the degree of magnification. As the magnification is increased, more and more of the upper portion of the image is lost to the operator viewing the image through the screen 2 but since the "lost" portion is in focus if the viewed portion is in focus and since the degree of magnification is the same in directions parallel to the baseline and normal to it, the operator can be assured that a permanent record produced from only a partially viewed image will fall within a desired frame size on the print plane 3, if the viewed part falls within the intended limits on the screen 2. To this end the screen 2 may be marked with a series of vertical lines indicating the side edges of different sized sheets of paper based on the DIN series of paper sizes (e.g. A0 to A4 — see the marking 2a in FIG. 3).

The apparatus shown in FIG. 3 shows the casing 1 with the screen 2 and a carrier 4a for microfilm input material 4, in conjunction with a multi-magazine paper sheet dispenser 10 and a developing station 11 leading to a copy rack 12. The dispenser 10 may be of any suitable type and acts to supply a selected number of sheets of paper from the selected magazine (i.e. paper of a selected size) to the casing 1 for exposure therein and the station 11 acts to develop a permanent image on the sheets so supplied before delivering them to the rack 12. These integers can be of conventional design and will not be further described.

The interior of the casing 1 is shown in some detail in FIG. 5, the same reference numerals as used in FIG. 1 being used in this Figure, where appropriate.

The mirror 7 is supported between a pair of carriages 13 (only one shown in FIG. 5) each carriage being mounted for movement along a pair of guide bars 14. The carriage 13 on one side of the casing is moved by an endless chain 15 which loops around a toothed wheel 16 driven, via a gear train 18, by an electric motor 17. The carriages 13 are mechanically linked via the shafts of upper sprockets 15a to move together along the bars 14. The gear train 18, includes a drive wheel for a potentiometer (not shown) to generate an electrical signal representative of the position of the mirror 7—and an extension 17a of the shaft of the motor 17 terminates in a knob 17b accessible from without the casing 1 to enable manual adjustment of mirror position to be made for fine focusing purposes.

Microswitches 18 and 19, define, respectively, the lower and upper limit positions of the mirror 7 and prevent overdrive of the carriages. A counterweight 20 balances the carriages/mirror assembly and a pointer 21 (linked to one of the carriages by a loop 22) indicates mirror position against a horizontal scale marked on the casing above the screen 2.

Movement of the mirror 8 between its view and print positions is effected by a motor 23 winding-up or unwinding a cord 24 on a drum 25. Microswitches 26 and 27 are in circuit with the motor 23 and are actuated when the mirror 8 is in one or other of its limit positions.

FIG. 4 shows the control panel of the machine which includes a "print" button 28, a pre-settable two digit seven-segment numerical display 29 (on which the number of prints required can be set), an exposure control dial 30, a paper size selector 31 and magnification control buttons 32 and 33.

The machine is normally set in the view mode with the mirror 7 at the height corresponding to the magnification necessary to enlarge the microfilm image onto the paper size selected on the selector 31. As shown in FIG. 4, the paper being set to reading "O" (i.e. for AO size paper), the mirror 7 will be in its upper position. When set at "4" (for A4 size paper) it will be in its lower position. When the selector 31 is adjusted to a different paper size the appropriate paper magazine is brought into circuit and the motor 17 energised until the potentiometer linked to the train 18 assumes the value appropriate to the magnification required for that paper size.

When it is desired to take a print of the projected image, the number of copies required is set on display 29, the estimated exposure needed dialled on dial 30 and the button 28 pressed. The machine now performs automatically, moving the mirror 8 into its "print" position, allowing the entire projected image to fall on the print plane 3, and obscuring the screen 2, delivering a sheet from the dispenser 10 to the plane 3, exposing the sheet for the set period and passing the sheet to the station 11. If just one copy has been called for, the mirror 8 returns to its "view" position when the paper has entered the station 11, otherwise when the last sheet called for has entered the station 11.

In addition to setting the magnification automatically (by selecting paper size on the selector 31), the mirror 7 can be moved up by the motor 17 when button 32 is pressed or down when the button 33 is pressed. Fine manual control of the mirror can be achieved by turning the knob 17b.

In a practical piece of apparatus the automatic focusing is to an accuracy of ± 0.1 magnification, the buttons 32, 33 allow an accuracy of ± 0.05 magnification and manual control up to ± 0.005 magnification.

From what has been said, it will be appreciated that if an operator wishes to see a complete image he can move the mirror 7 into a position such that the entire image is viewed on the screen 2 and can then view the input material until he locates an image of which he desires a permanent record. If the permanent record required is to be of a different size, the operator merely needs to dial the paper size required causing automatic movement of the mirror 7. If the automatically set accuracy of magnification is not sufficient, the knob 17b can be turned to adjust the focus on that part of the image seen on the screen 2. Finally, the apparatus is switched to the "print" mode so that the full image is printed down onto a sheet of chosen size paper on the print plane 3.

In the case of engineering drawings the region of the drawing adjacent to the bottom edge normally contains the classifying information and it may frequently be unnecessary for the operator to view the entire image on the screen 2 to enable him to produce an accurately focused permanent record at the largest degree of magnification with the image accurately positioned on the paper.

If the mirror 8 in its "view" position partially obstructs the light from the lens 5 to the mirror 7, it may be necessary to cut away a small region of the mirror 7 but, in general, this will not affect the performance of the apparatus.

Conveniently the apparatus is arranged in such a manner that the casing can be opened to permit the operator to see the complete image on the print plane 3 for any degree of magnification and/or to adjust the position of a sheet of paper on the plane 3.

Suitable interlocks are provided to ensure that the mirror 7 cannot be moved during exposure of an image and that a print sequence cannot be started until the mirror 7 is stationary.

By appropriate design of the carrier 4a it can be arranged for the input material 4 to be moved transversely (i.e. without affecting focus) and this enables the operator to move the image relative to the screen 2 to examine regions of the image which would not otherwise be visible or to take a permanent record of only part of the whole image (e.g. that part of an image projected at maximum magnification onto a sheet of A4 size paper). For this latter mode of operation, the paper size would be dialled on selector 31 and then button 32 pressed to increase the magnification beyond that automatically set.

What is claimed is

1. A view/print apparatus comprising a casing, a back-projection viewing screen forming part of the casing on which an image to be viewed is projected from within the casing, image projection means, a print plane on which a light-sensitive sheet of image recording material is located for exposure to said image when the print facility is to be employed, a mirror movable between "view" and "print" positions, in the former of which said image is projected on the screen with a selected accuracy of focus and in the latter of which said image is projected on the print plane with substantially no change in the accuracy of focus, and means to vary the size of said image up to a maximum rectangular frame size, characterised in that the screen is dimensioned and positioned in the casing to accommodate only a part of said image when the size-varying means is set for maximum frame size, that part including one complete edge of the maximum sized frame and a region adjacent thereto.

2. Apparatus as claimed in claim 1, in which the mirror in its "print" position masks the print plane from ambient light passing through the viewing screen.

3. Apparatus as claimed in claim 1 in which the mirror, in its "view" position bisects the angle between the print plane and the viewing screen.

4. Apparatus as claimed in claim 1 in which the viewing screen is dimensioned and positioned to permit an operator to view a narrow strip adjacent to the bottom edge of the rectangular frame when viewing on maximum enlargement but is large enough to accommodate the entire image on the smallest enlargement.

5. Apparatus as claimed in claim 1 whereby the size-varying means is arranged so that the image of said one edge does not move normal to itself when the degree of magnification is altered.

6. Apparatus as claimed in claim 1, in which the casing incorporates a horizontal printing plane, a viewing screen inclined to the horizontal at an angle of between 90° and 45° and the size-varying means incorporates a mirror inclined to the horizontal and movable to different heights above the printing plane, each particular height corresponding to a particular degree of magnification.

7. Apparatus as claimed in claim 6 comprising a paper sheet dispenser capable of feeding paper of a selected size to the print plane automatically, the paper size selector being coupled to means adjusting the height of the mirror whereby the magnification is always selected to project a standard size image substantially from edge to edge of the selected paper size.

8. Apparatus as claimed in claim 1, in which the selection of a print mode automatically moves the view mirror to the "print" position and then automatically delivers paper to the print plane exposes it to the projected image in the print plane and discharges it from the print plane into a developing station.

* * * * *